US 8,660,395 B2

(12) United States Patent
Rochette et al.

(10) Patent No.: US 8,660,395 B2
(45) Date of Patent: Feb. 25, 2014

(54) HIGHLY NONLINEAR OPTICAL WAVEGUIDE STRUCTURE WITH ENHANCED NONLINEARITY AND MECHANICAL ROBUSTNESS

(76) Inventors: Martin Rochette, Montreal (CA); Chams Baker, Montreal (CA)

(*) Notice: Subject to any disclaimer, the term of this patent is extended or adjusted under 35 U.S.C. 154(b) by 378 days.

(21) Appl. No.: 12/787,219

(22) Filed: May 25, 2010

(65) Prior Publication Data
US 2011/0217001 A1 Sep. 8, 2011

Related U.S. Application Data

(60) Provisional application No. 61/310,534, filed on Mar. 4, 2010.

(51) Int. Cl.
*G02B 6/00* (2006.01)
(52) U.S. Cl.
USPC ............. 385/122; 385/28; 385/123; 385/129; 385/130; 385/141; 385/142
(58) Field of Classification Search
USPC .......................................... 385/28, 122, 142
See application file for complete search history.

(56) References Cited

U.S. PATENT DOCUMENTS

| | | | |
|---|---|---|---|
| 5,239,176 A * | 8/1993 | Stevenson | 250/227.25 |
| 6,115,519 A * | 9/2000 | Espindola et al. | 385/43 |
| 6,658,183 B1 * | 12/2003 | Chandalia et al. | 385/48 |
| 2007/0025410 A1 * | 2/2007 | Agarwal et al. | 372/94 |
| 2009/0155770 A1 * | 6/2009 | Brown et al. | 435/5 |

OTHER PUBLICATIONS

Dumais et al ("Enhanced self-phase modulation in tapered fibers", Optics Letters, vol. 18, No. 23, Dec. 1, 1993, pp. 1196-1198).*
Afshar et al., "A full vectorial model for pulse propagation in emerging waveguides with subwavelength structures part I: Kerr nonlinearity", Optic Express, vol. 17., No. 4, Feb. 16, 2009, pp. 2298-2318.
Dumais et al., "Enhanced self-phase modulation in tapered fibers", Optics Letters, vol. 18, No. 23, Dec. 1, 1993, pp. 1996-1998.
Fu et al., "Investigation of self-phase modulation based optical regeneration in single mode As2Se3 chalcogenide glass fiber", Optic Express, vol. 13., No. 19, Sep. 19, 2005, pp. 7637-7644.
Mägi et al., "Enhanced Kerr nonlinearity in sub-wavelength diameter As2Se3 chalcogenide fiber tapers", Optic Express, vol. 15., No. 16, Aug. 6, 2007, pp. 10324-10329.
Slusher et al., "Large Raman gain and nonlinear phase shifts in high-purity As2Se3 chalcogenide fibers", J. Opt. Soc. Am. B, vol. 21, No. 6, Jun. 2004, pp. 1146-1155.
Swalen et al., "Properties of Polymeric Thin Films by Integrated Optical Techniques", IBM J. Res. Develop., Mar. 1977, pp. 168-175.

* cited by examiner

*Primary Examiner* — Ryan Lepisto
(74) *Attorney, Agent, or Firm* — Benoît & Côté Inc.

(57) ABSTRACT

There is described an optical waveguide structure exhibiting nonlinear properties, a method of fabricating such, and an optical coupling device made of two of such optical waveguide structures. The optical waveguide structure comprises an optical waveguide portion made of a light transmitting material for supporting a light mode traveling therein. The light transmitting material has an intrinsic nonlinearity parameter suitable for inducing a nonlinearity on the light mode, and the optical waveguide portion having a diameter sized to securely confine the light mode therein and to increase the nonlinearity on the light mode. The optical waveguide structure also has a coating surrounding the optical waveguide portion to mechanically support or to protect the optical waveguide portion from surface damage.

4 Claims, 5 Drawing Sheets

HIGHLY NONLINEAR OPTICAL WAVEGUIDE STRUCTURE WITH ENHANCED NONLINEARITY AND MECHANICAL ROBUSTNESS

CROSS-REFERENCE TO RELATED APPLICATIONS

This application claims priority under 35USC §119(e) of U.S. provisional patent application 61/310,534, filed Mar. 4, 2010 and entitled "Highly nonlinear optical waveguide structure with enhanced Nonlinearity and Mechanical Robustness", the specification of which is hereby incorporated by reference.

TECHNICAL FIELD

The present disclosure relates to optical waveguides and more particularly to optical waveguides which exhibit nonlinear effects.

BACKGROUND

Highly nonlinear optical waveguides are raising a lot of interest for their use with photonic devices. A desirable property of such waveguides is a large nonlinear waveguide parameter $\gamma \cong 2\pi n_2/(\lambda A_{eff})$ to minimize the nonlinear waveguide length and thus improve the device compactness, as well as minimizing the optical power consumption. A logical approach to maximize $\gamma$ is to make the nonlinear waveguide out of a material with a large intrinsic nonlinearity (i.e. large $n_2$ parameter) and to ensure that the guided mode is strongly confined to minimize its effective surface area (i.e. small $A_{Eff}$). ("Nonlinear fiber optics" by Agrawal, fourth edition, Academic press, 2007).

Amongst the materials known to exhibit a large $n_2$, chalcogenide glasses are of particular interest for device applications based on Kerr nonlinearity as they exhibit an $n_2$ in the order of 100-1000 times greater than that of silica, low two photon absorption and a fast response time of less than about 100 femtoseconds (fs) (refer to: R. E. Slusher, G. Lenz, J. Hodelin, J. Sanghera, L. B. Shaw, and I. D. Aggarwal, "Large Raman gain and nonlinear phase shifts in high-purity As2Se3 chalcogenide fibers," *J. Opt. Soc. Am. B-Opt. Phys.* 21, 1146-1155 (2004)).

In parallel with this, waveguide structures with minimized $A_{Eff}$ such as microtapers also provide a significant increase in the nonlinear waveguide parameter (refer to: P. Dumais, F. Gonthier, S. Lacroix, J. Bures, A. Villeneuve, P. G. J. Wigley, and G. I. Stegeman, "Enhanced self-phase modulation in tapered fibers," *Opt. Lett.* 18(23), 1996-1998 (1993)).

By combining both the large $n_2$ parameter and a small $A_{eff}$, chalcogenide microtapers made from an $As_2Se_3$ fiber tapered down to ~1 µm in diameter have provided a high waveguide nonlinearity approaching $\gamma=100$ $W^{-1}m^{-1}$ (refer to: E. C. Mägi, L. B. Fu, H. C. Nguyen, M. R. E. Lamont, D. I. Yeom, and B. J. Eggleton, "Enhanced Kerr nonlinearity in sub-wavelength diameter $As_2Se_3$ chalcogenide fiber tapers" Opt. Express, 15(16), 10324-10329 (2007)). Although such chalcogenide microtapers have one of the currently highest waveguide nonlinearity, their use is seriously impaired because a glass wire with a diameter of 1 µm is extremely fragile. For instance, a weak air current suffices to break this unprotected microtaper. In addition, the chalcogenide-air interface of this waveguide enables evanescent interaction with the environment outside the chalcogenide wire. This is not always desirable since unwanted dust particles setting on the microtaper may lead to light scattering, losses, and signal degradation. In other instances, two such microtapers can be aligned and placed at close distance to enable evanescent wave interaction between waveguides and thus coupling. However the distance between microtapers is hardly controlled because the thin microtapers tend to attract and stick to each other when taken in close proximity. The amount of coupling is thus not controllable with such device.

There is thus a need for an improved highly nonlinear waveguide structure which at least addresses some of the above noted limitations associated with the prior art.

SUMMARY

In accordance with an embodiment, there is provided an optical waveguide structure exhibiting nonlinear properties, comprising: an optical waveguide portion made of a light transmitting material for supporting a light mode traveling therein, the light transmitting material having an intrinsic nonlinearity parameter suitable for inducing a nonlinearity on the light mode, and the optical waveguide portion having a diameter sized to securely confine the light mode therein and to increase the waveguide nonlinear parameter; and a coating surrounding the optical waveguide portion to mechanically support or to protect the optical waveguide portion from surface damage.

In accordance with an embodiment, there is provided a method for fabricating a hybrid optical waveguide structure, the method comprising: inserting an optical waveguide into a hollow cylinder of a coating material, the coating material differing from a material of the optical waveguide, the optical waveguide comprising a core and a surrounding cladding for substantially confining a mode of light traveling therein; applying heat at a temperature which induces a uniform collapse of the coating material over the optical waveguide, to form a hybrid optical waveguide; and upon the heat being applied, forming a new optical waveguide by stretching the hybrid optical waveguide until a diameter of the hybrid optical waveguide is reduced to cause the surrounding cladding to form part of the core and the coating material to become a cladding of the new optical waveguide, thereby better confining the mode of light into the core and the surrounding cladding of the optical waveguide once stretched.

In accordance with an embodiment, there is provided a non-linear optical coupling device comprising: a first non-linear optical microtaper and second non-linear optical microtaper, each one of the first non-linear optical microtaper and the second non-linear optical microtaper comprising a section of non-linear light transmitting material, the section having a diameter sufficiently tapered to confine a single light mode therein and increase a nonlinear waveguide parameter; and wherein the second non-linear optical microtaper is disposed along a plane which is non-perpendicular to a first plane of the first non-linear optical microtaper, at a distance from the first non-linear optical microtaper.

In the present description, the term "light" is meant to refer to any electromagnetic radiation having a wavelength in a range supported by a particular optical waveguide structure. For example, this range might be in the ultraviolet, visible light, infrared and microwave spectrum.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

There will now be described one embodiment of an optical waveguide structure exhibiting nonlinear properties, and more specifically that of a hybrid microtaper waveguide made out of a combination of chalcogenide and polymer. It is however noted that other materials having large intrinsic nonlinear parameters and being suited to transmit light within a desired wavelength range.

Figure 1A:
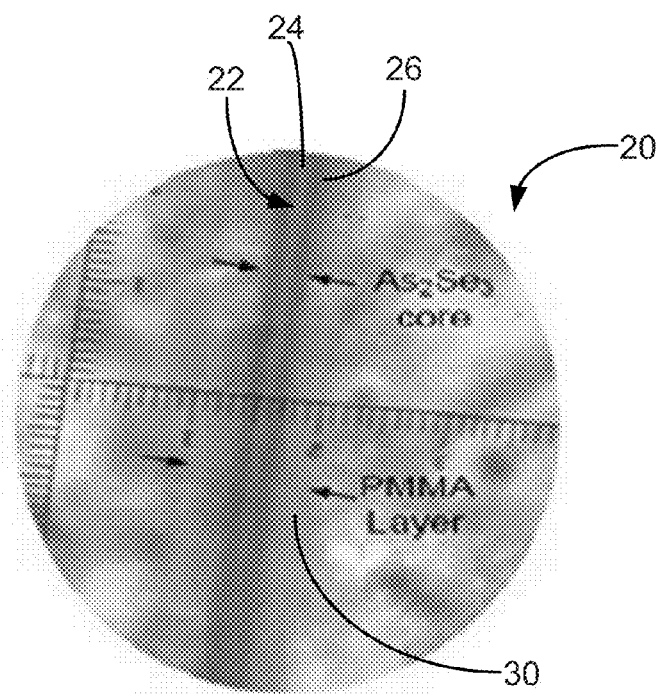
FIG. 1a is a photograph of an optical waveguide structure exhibiting nonlinear properties, in accordance with an embodiment.
Figure 1B:
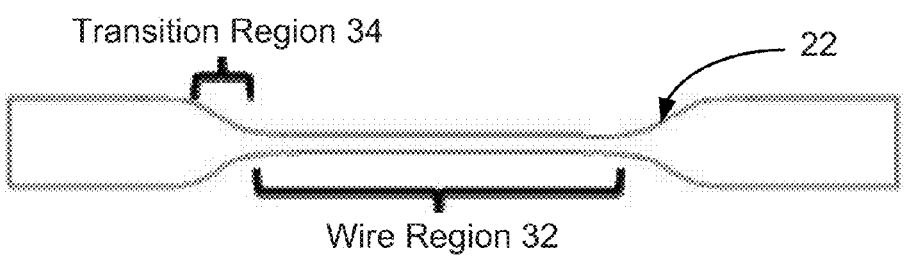
FIG. 1b is a schematic cross-sectional view of the optical waveguide structure of FIG. 1, in accordance with an embodiment.

As seen from FIGS. 1a and 1b, an embodiment of an optical waveguide structure 20 exhibiting nonlinear properties has an optical waveguide 22 made of a light transmitting material for supporting (i.e., substantially confining and transmitting) a light mode therethrough. For example, the optical waveguide section 22 consists of a core 24 and a surrounding cladding 26, with the core 24 generally having a higher refractive index than the cladding 26. The light transmitting material has an intrinsic nonlinearity parameter sufficiently high to induce nonlinearity on the light mode. The optical waveguide 22 also has a diameter shaped so as to securely confine a light mode therein and increase the nonlinearity on the light mode. In one instance, the diameter is sufficiently tapered to confine a single light mode therein.

Those skilled in the art will understand that the present description also applies other types of optical fibers such as microstructure fibers. In microstructure fibers, there are air holes (like a honeycomb) which act as the cladding.

The optical waveguide structure 20 also has a coating 30 (FIG. 1a) surrounding the optical waveguide 22 to protect the optical waveguide 22 from surface damage which could degrade its efficiency. In one instance, the coating 30 is designed to have a refractive index suitable for preventing evanescent interaction of the light mode with an exterior of the optical waveguide structure 20, as it travels through the optical waveguide section 22. For example, a given thickness of the coating 30 provides for only protection or for both protection and prevention of evanescent interaction in the space surrounding the polymer. In a specific example, while a thinner layer provides protection, a thicker layer provides also prevention of evanescent interaction in the space surrounding the polymer.

In one embodiment, the coating 30 is made of a polymer-based material which is able to transmit light.

It noted that the optical waveguide 22 is implementable as a step indexed waveguide, a microstructure waveguide, or any other optical waveguide suitable for confining and transmitting a light mode therein.

The fabrication and optical characterization of the optical waveguide structure 20 (herein below also referred to as a hybrid chalcogenide-polymer microtaper, or simply microtaper) will now be described.

The optical waveguide 22 of the microtaper 20 induces a strong Kerr effect whereas the polymer coating 30 provides mechanical strength. As stated above, in one specific embodiment, the coating 30 also controls the evanescent light interaction, as will be described below.

The hybrid microtaper 20 as per the below description provides a highly nonlinear medium for compact optical nonlinear devices.

FIG. 1a shows a wire region 32 of such a hybrid chalcogenide-polymer microtaper 20, while FIG. 1b schematically illustrates the geometrical structure of the hybrid microtaper 20, with indications for the wire region 32 and the transition region 34 (not shown in FIG. 1a). In the embodiment of FIG. 1a, the wire region 32 diameter is 3 μm and the diameter with the surrounding polymer coating is 10 μm. Other dimensions are also possible.

In one embodiment, Arsenic triselenide ($As_2Se_3$) forms the optical waveguide 22 due to its properties with infrared optics (i.e. it has a high intrinsic nonlinearity $n_2$ and it transmits light having wavelengths between 870 nm and 17.2 μm). Other types of chemical compounds can however be chosen for transmission of light at different wavelength ranges. Examples include but are not limited to: $As_2S_3$, semiconductors such as silicon, AlGaAs, glasses such as tellurite, lead silicate and bismuth, or any glass having a softening temperature compatible with a softening temperature of the protective surrounding coating 30.

Simulations based on a vectorial field analysis (refer to: S. Avshar and T. M. Monro, "A full vectorial model for pulse propagation in emerging waveguides with sub-wavelength structures part I: Kerr nonlinearity," Opt. Express 17(4), 2298-2318 (2009).), permitted to determine that in one specific embodiment, an optimal γ is attainable with a microtaper 20 having a diameter of 0.56 μm.

Relevant optical constants related to $As_2Se_3$ include the intrinsic nonlinear coefficient $n_2=1.1\times10^{-17}$ $m^2W^{-1}$ and refractive index $n_{AsSe}=2.83$ at a wavelength of 1550 nm (see R. E. Slusher, G. Lenz, J. Hodelin, J. Sanghera, L. B. Shaw, and I. D. Aggarwal, "Large Raman gain and nonlinear phase shifts in high-purity As2Se3 chalcogenide fibers," *J. Opt. Soc. Am. B-Opt. Phys.* 21, 1146-1155 (2004)).

In one embodiment, the polymer coating 30 is made of PolyMethyl MethAcrylate (PMMA) with a refractive index of nPMMA=1.49 (see J. Swalen, R. Santo, M. Tacke, and J. Fischer, "Properties of polymeric thin films by integrated optical techniques," *IBM Journal of research & Development* 21, 168 (1977)). Other materials can be used, as long as a softening temperature of the coating 30 is compatible with the optical waveguide 22 softening temperature.

The microtaper 20 is fabricated using a heat and stretch recipe specifically adapted to the desired design of the hybrid microtaper 20. In one example, an $As_2Se_3$ fiber such as one made available by Coractive High-Tech serves as the material for the optical waveguide 22. Such an optical fiber initially has a core and a surrounding cladding presenting a diameter of approximately 5.6/136 µm and numerical aperture NA=0.26.

In one embodiment, the fiber is pre-stretched to reduce its core diameter down to approximately 5.6 µm and ensure single-mode propagation if this is not already the case. This step is however optional.

Still referring to FIGS. 1a and 1b, the optical waveguide 22 formed by a fiber in this case, is then optionally cleaved and inserted into a hollow cylinder made of a coating material. In a specific example, the cylinder has an internal/external diameter of approximately 230/1000 µm.

Then, in one embodiment, the optical waveguide 22 is butt-coupled and secured to standard silica fibers using UV cured epoxy.

In one embodiment, the assembly is then heated at approximately 160° C. to uniformly collapse the coating 30 material of the cylinder (also referred to as a rod) over the modified chalcogenide fiber (i.e. the optical waveguide 22).

The temperature is then raised at the softening point of the optical waveguide 22 material (here for $As_2Se_3$, at approximately 190° C.), and the assembly is stretched adiabatically until the $As_2Se_3$ wire region 32 of the hybrid microtaper reaches a diameter of approximately 1.7 µm. At that point, the uniform wire region of the microtaper 20 has a length of approximately 7.0 cm and the diameter of the polymer coating 30 is approximately 5.6 µm.

This stretching of the hybrid optical waveguide is performed until its diameter is reduced to cause the cladding 26 to form part of the core 24 and the coating 30 material to become a cladding surrounding the optical waveguide 22, thereby better confining the mode of light into the core 24 and the surrounding cladding 26 of the optical waveguide 22 once stretched.

In one instance, the stretching is done until the diameter is sufficiently reduced to ensure an increase in the nonlinear waveguide parameter.

Figure 2:
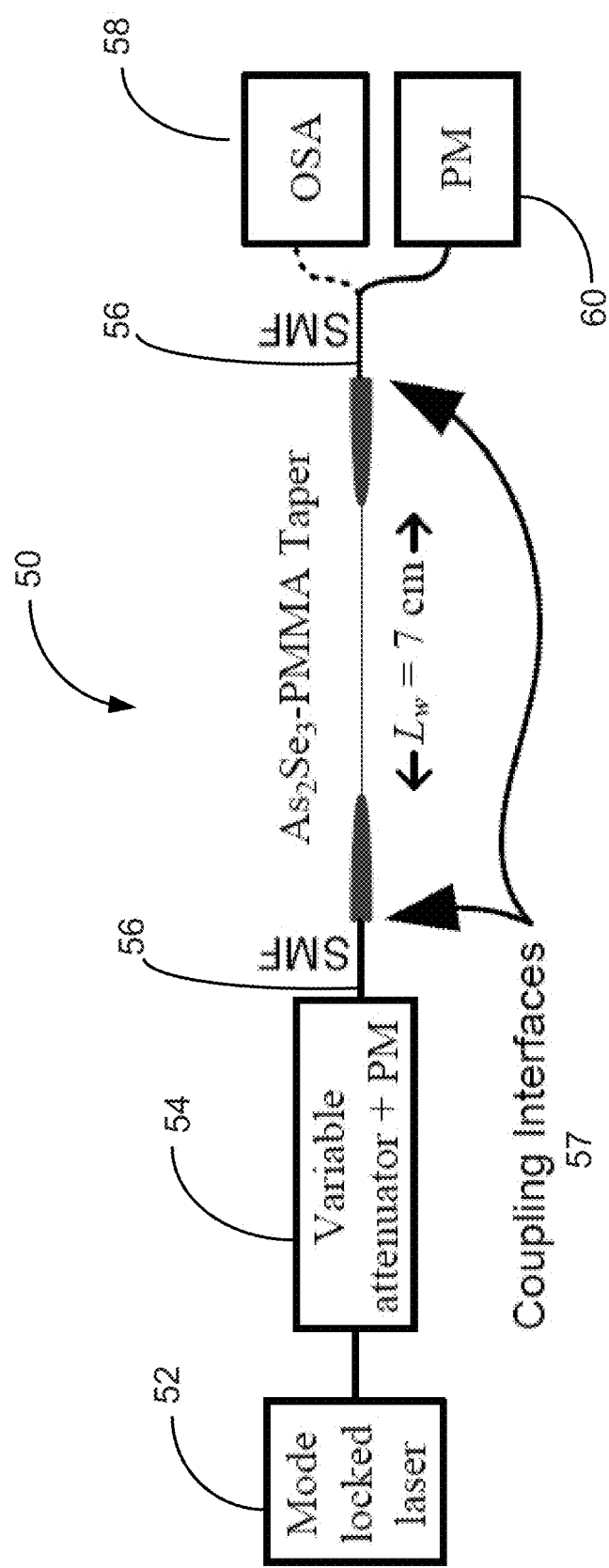
FIG. 2 is a schematic drawing of a measurement setup for characterizing an optical waveguide structure such as that of FIG. 1, in accordance with an embodiment.

Now referring to FIG. 2, which shows an example of a setup 50 used to characterize the linear and nonlinear properties of one embodiment of a hybrid microtaper 20 which has an $As_2Se_3$ wire section diameter of 1.7 µm and a length of 7.0 cm. A mode-locked laser 52 sends pulses of width 330 fs at a repetition rate of 20 MHz and at a central wavelength of λ=1552.4 nm. The power of the pulses is controlled using a variable attenuator (VA) with an in-line power meter (PM), denoted as element 54. Light is then coupled to the hybrid microtaper 20 using coupling interfaces 57, via single-mode fiber sections (SMF) 56 before being sent to an optical spectrum analyser (OSA) 58 and/or another power meter (PM) 60.

In one example where the characterization of such hybrid microtaper 20 was performed, the insertion loss of the microtaper 20 from the variable attenuator (VA) 54 to the wire region 32 of the microtaper 20 (refer to FIGS. 1a and 1b) was found to be ~3.4 dB. The peak pulse power reaching the wire region is varied up to a maximum of 20 Watts.

Figure 3A:
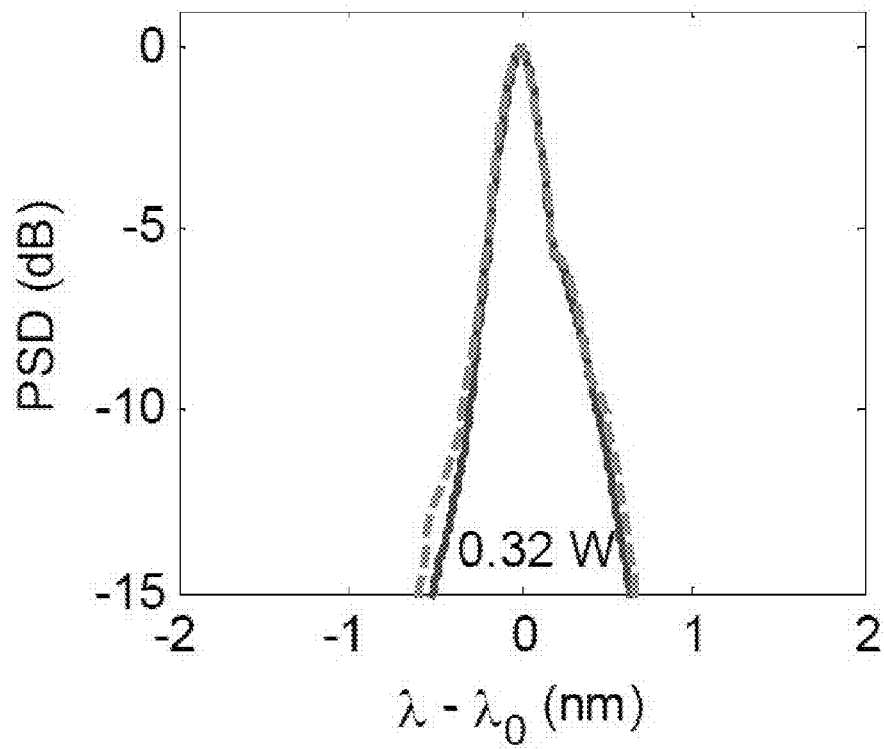
FIG. 3a is a graph showing an optical spectrum of pulses resulting at the optical spectrum analyzer (OSA) of FIG. 2, for a lower input peak power level, in accordance with an embodiment.
Figure 3B:
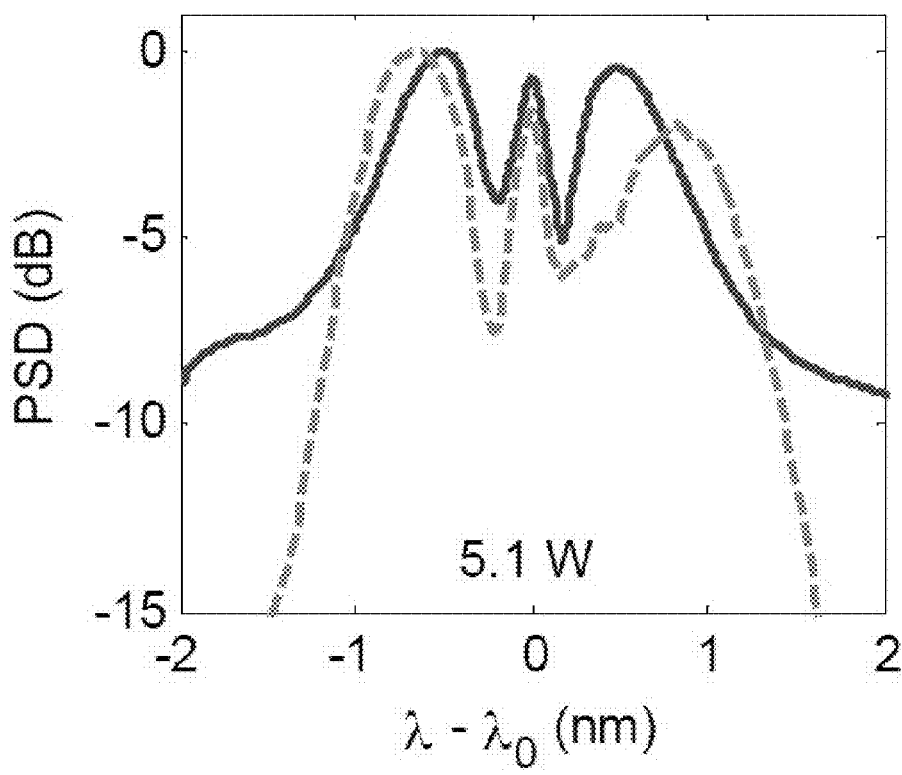
FIG. 3b is a graph showing an optical spectrum of pulses resulting at the optical spectrum analyzer (OSA) of FIG. 2, for an intermediate input peak power level, in accordance with an embodiment.
Figure 3C:
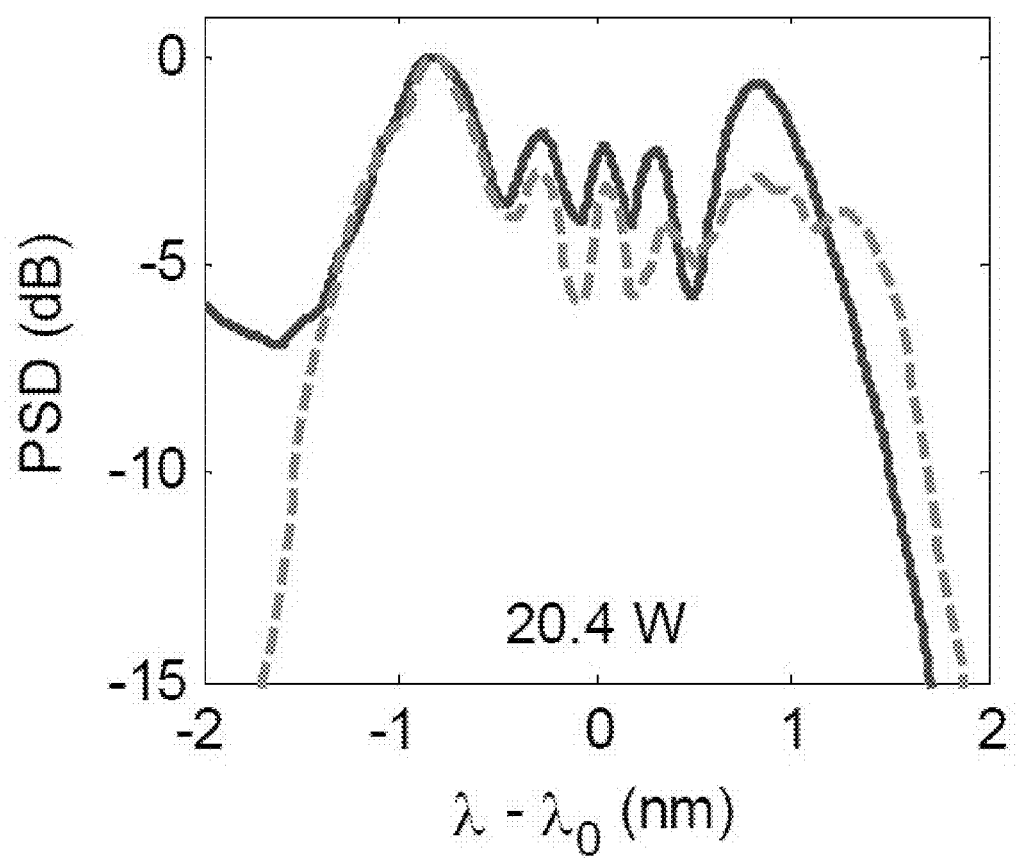
FIG. 3c is a graph showing an optical spectrum of pulses resulting at the optical spectrum analyzer (OSA) of FIG. 2, for a higher input peak power level, in accordance with an embodiment; remove

FIGS. 3a to 3c show optical spectra at the output of the hybrid microtaper 20, for three input peak power levels of respectively 0.32 W; 5.1 W; and 20.4 W. Referring back to the setup of FIG. 2, the measurements shown in dashed lines in each graph of FIGS. 3a to 3c, are taken once the light pulse has passed through the hybrid microtaper 20. The power levels shown correspond to power of the light signal at the wire section of the microtaper 20.

Pulse propagation simulations solving the nonlinear Schroedinger equation, as shown by the solid line in each one of FIGS. 3a to 3c, provide a good fit with the experimental results (dashed lines). Optical constants in the simulation include the linear absorption $\alpha=0.23$ m$^{-1}$ and nonlinear absorption $a_2=2.5\times10^{-12}$ m/W (see R. E. Slusher, G. Lenz, J. Hodelin, J. Sanghera, L. B. Shaw, and I. D. Aggarwal, "Large Raman gain and nonlinear phase shifts in high-purity As2Se3 chalcogenide fibers," J. Opt. Soc. Am. B-Opt. Phys. 21, 1146-1155 (2004).; L. B. Fu, M. Rochette, V. G. Ta'eed, D. J. Moss, and B. J. Eggleton, "Investigation of self-phase modulation based optical regeneration in single mode As2Se3 chalcogenide glass fiber," Opt. Express 13, 7637-7644 (2005)).

In this specific example, the microtaper 20 properties as expected from the best fit, lead to a waveguide nonlinear parameter of $\gamma=45$ W$^{-1}$ m$^{-1}$ and chromatic dispersion parameters $\beta_2=1.9$ ps$^2$/m and $\beta_3=0.045$ ps$^3$/m. Those values are also supported by the vectorial field analysis of a wire section of 1.7 µm in diameter surrounded by a PMMA cladding. Decreasing further the wire region diameter towards the 0.56 µm in turn increases the nonlinear waveguide parameter up to $\gamma=185$ W$^{-1}$m$^{-1}$ or beyond.

The above has described a hybrid $As_2Se_3$-PMMA microtaper which simultaneously provides an ultrahigh nonlinearity and sufficient mechanical robustness for normal handling. The $As_2Se_3$ wire section of the hybrid microtaper had a diameter of 1.7 µm and a length of 7.0 cm, thereby leading to $\gamma=45$ W$^{-1}$m$^{-1}$. The polymer coating made of PMMA has a softening temperature compatible with $As_2Se_3$ and enables a simultaneous stretching of both materials without significant residual stress. Hybrid $As_2Se_3$-PMMA microtapers are a compact alternative to several kilometers of commercially available nonlinear fibers made of silica. It also enables a wider range of applications from dispersion engineering that comes from the high refractive index contract of chalcogenide microtaper.

Figure 4A:
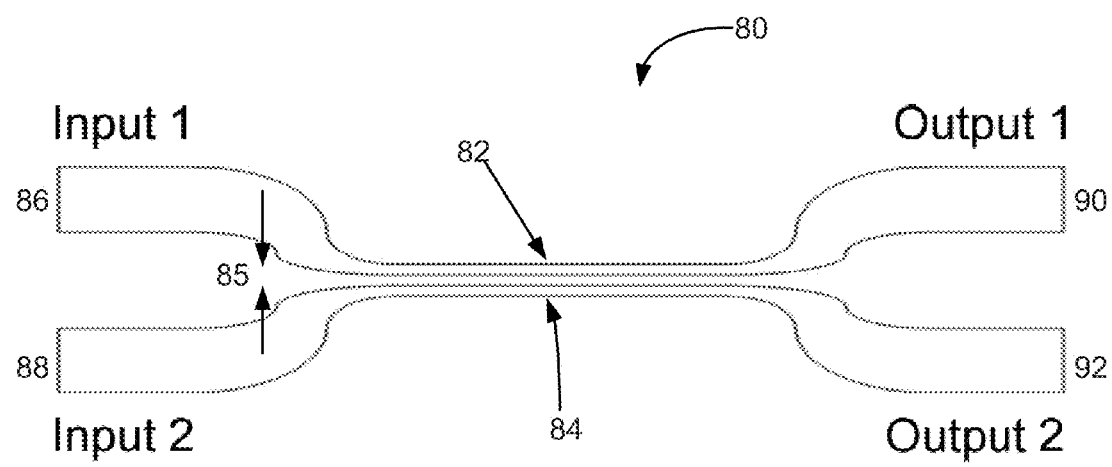
FIG. 4a is a schematic illustration of a non-linear optical coupling device in accordance with an embodiment.

Now referring to FIG. 4a, which illustrates an embodiment of a non-linear optical coupling device 80. The coupling device 80 comprises first and second non-linear optical microtapers 82, 84. Each one of the first and second non-linear optical microtapers 82, 84 is made of a section of highly non-linear light transmitting material. The section has a diameter which is tapered down sufficiently to securely confine a light mode, reducing the effective cross-sectional area for the light mode so as to increase the nonlinear waveguide parameter. The second microtaper 84 is disposed along a plane which is non-perpendicular to a first plane of the first microtaper 82, at a distance 85 from the first microtaper.

In one embodiment, since both non-linear optical microtapers 82, 84 present a non-linearity which depends on an input light characteristic such as intensity, the switching between input ports 86, 88 and the output ports 90, 92, of the coupling device 80 will be dependent upon the light intensity at the input ports 86, 88.

Figure 4B:
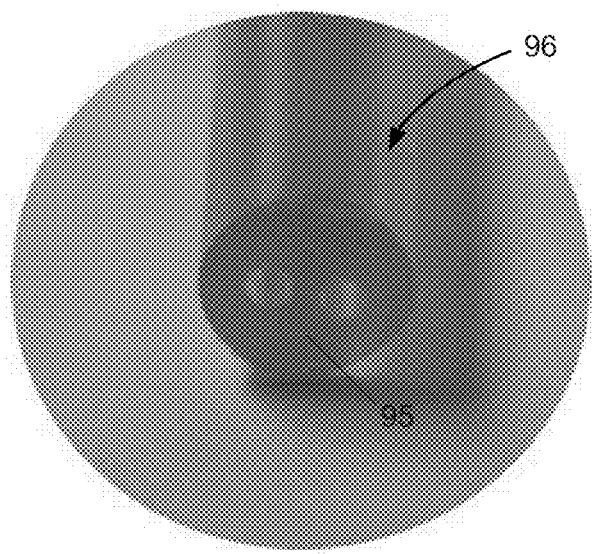
FIG. 4b is a picture of a polymer rod with two boreholes used in the fabrication of the coupling device of FIG. 4a, in accordance with an embodiment.

In one embodiment, the distance 85 between the two microtapers comprises a coating 95 of polymer, which by the same token, mechanically supports and protects both microtapers 82, 84 but allows for evanescent interaction. In a specific embodiment, the fabrication of such a coupling device 80 is as per the above described method. In one instance, a two boreholes structure 96 of coating 95 as shown in FIG. 4b is used instead of the above described cylinder. As above, the type of polymer can be chosen depending on its light transmitting characteristics.

Alternatively to the above, in another instance, two hybrid microtapers each having a respective polymer coating, are arranged side by side to form a coupling device 80.

In one embodiment, the distance between both microtapers 82, 84 and their respective lengths are chosen depending on the specific operational characteristics of the optical coupling device 80.

While preferred embodiments have been described above and illustrated in the accompanying drawings, it will be evident to those skilled in the art that modifications may be made therein without departing from the scope of this disclosure. Such modifications are considered as possible variants comprised in the scope of the disclosure.

The invention claimed is:

1. An optical waveguide structure exhibiting nonlinear properties, comprising:
an optical waveguide portion made of a light transmitting material for supporting a light mode traveling therein, the light transmitting material having an intrinsic nonlinearity parameter suitable for inducing a nonlinearity on the light mode, wherein a diameter of the light transmitting material is smaller over the optical waveguide portion than over the remainder of the optical waveguide structure, said diameter being sized to securely confine a single light mode in the optical waveguide portion and to increase a waveguide nonlinear parameter; and
a coating surrounding the optical waveguide portion to mechanically support and to protect the optical waveguide portion from surface damage; wherein the optical waveguide portion comprises glass and the coating comprises a polymer exhibiting a refractive index suitable for controlling evanescent interaction of the single light mode with an exterior of the optical waveguide structure.

2. The optical waveguide structure of claim 1, wherein the coating surrounding the optical waveguide portion has a thickness appropriate to control the amount of evanescent interaction with the surrounding environment.

3. The optical waveguide structure of claim 1, wherein the optical waveguide portion comprises a core and a surrounding cladding, the surrounding cladding for substantially confining the single light mode within the optical waveguide portion.

4. The optical waveguide structure of claim 3 wherein the smaller diameter of the optical waveguide portion is such that the cladding forms part of the core of the optical waveguide portion, and the coating material forms part of the cladding of the optical waveguide portion, to better confine the single light mode into the core and the surrounding cladding of the optical waveguide portion.

* * * * *